US010797273B2

(12) United States Patent
Kim et al.

(10) Patent No.: US 10,797,273 B2
(45) Date of Patent: Oct. 6, 2020

(54) RECHARGEABLE BATTERY

(71) Applicant: SAMSUNG SDI CO., LTD., Yongin-si, Gyeonggi-do (KR)

(72) Inventors: Yu-Na Kim, Yongin-si (KR); Dong-Myeong Kim, Yongin-si (KR); Jong-Ha Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 73 days.

(21) Appl. No.: 14/996,167

(22) Filed: Jan. 14, 2016

(65) Prior Publication Data

US 2016/0301041 A1    Oct. 13, 2016

(30) Foreign Application Priority Data

Apr. 7, 2015   (KR) .......................... 10-2015-0049232

(51) Int. Cl.
*H01M 2/06* (2006.01)
*H01M 2/26* (2006.01)
(Continued)

(52) U.S. Cl.
CPC ........... *H01M 2/06* (2013.01); *H01M 2/0277* (2013.01); *H01M 2/04* (2013.01); *H01M 2/0456* (2013.01); *H01M 2/0482* (2013.01); *H01M 2/26* (2013.01)

(58) Field of Classification Search
CPC ........ H01M 2/06; H01M 2/0482; H01M 2/04; H01M 2/0456; H01M 2/26; H01M 2/277
See application file for complete search history.

(56) References Cited

U.S. PATENT DOCUMENTS 3,689,334 A * 9/1972 Dermody ................ B32B 15/08
156/73.5
6,197,445 B1 * 3/2001 Ward ..................... H01M 2/0452
429/163
(Continued)

FOREIGN PATENT DOCUMENTS

CN        1914749 A    2/2007
CN       101420017 A    4/2009
(Continued)

OTHER PUBLICATIONS

Translation and JPO Abstract Jul. 1997 for JP 11-025993.*
(Continued)

*Primary Examiner* — Jonathan G Leong
*Assistant Examiner* — Aaron J Greso
(74) *Attorney, Agent, or Firm* — Lewis Roca Rothgerber Christie LLP

(57) ABSTRACT

A rechargeable battery includes: an electrode assembly including a first electrode and a second electrode; a housing having an open side, the housing accommodating the electrode assembly; a cap assembly including a cap plate for closing and sealing the open side of the housing; a first current collecting member under the cap assembly and connected to the first electrode; a second current collecting member under the cap assembly and connected to the second electrode; and an insulating case joined with the cap assembly, arranged between the cap plate and the electrode assembly, and having grooves at portions thereof respectively corresponding to the first and second current collecting members.

9 Claims, 5 Drawing Sheets

(51) Int. Cl.
*H01M 2/04* (2006.01)
*H01M 2/02* (2006.01)

(56) References Cited

U.S. PATENT DOCUMENTS

| | | | |
|---|---|---|---|
| 2006/0115725 A1* | 6/2006 | Kim | H01M 2/08 |
| | | | 429/174 |
| 2006/0269838 A1* | 11/2006 | Song | H01M 2/0404 |
| | | | 429/174 |
| 2008/0233472 A1* | 9/2008 | Ota | H01M 2/1061 |
| | | | 429/122 |
| 2009/0110964 A1 | 4/2009 | Dobata et al. | |
| 2009/0136838 A1 | 5/2009 | Abe et al. | |
| 2009/0311594 A1 | 12/2009 | Uh | |
| 2010/0273046 A1* | 10/2010 | Kuo | B29C 45/14639 |
| | | | 429/175 |
| 2011/0070466 A1 | 3/2011 | Park et al. | |
| 2011/0123837 A1* | 5/2011 | Baek | H01M 2/0257 |
| | | | 429/7 |
| 2013/0084472 A1 | 4/2013 | Choi et al. | |
| 2013/0196229 A1 | 8/2013 | Shiraishi et al. | |
| 2014/0212743 A1 | 7/2014 | Kim | |
| 2016/0155999 A1 | 6/2016 | He et al. | |
| 2016/0190657 A1* | 6/2016 | Hirose | H01M 2/06 |
| | | | 429/7 |

FOREIGN PATENT DOCUMENTS

| | | | | |
|---|---|---|---|---|
| CN | 101442142 A | | 5/2009 | |
| CN | 101604760 A | | 12/2009 | |
| CN | 202549944 | * | 11/2012 | H01M 2/04 |
| CN | 202549944 U | | 11/2012 | |
| CN | 103227295 A | | 7/2013 | |
| CN | 204118140 U | | 1/2015 | |
| JP | 11-025993 | * | 7/1997 | H01M 6/02 |
| JP | 11-25993 A | | 1/1999 | |
| JP | 2009-302056 A | | 12/2009 | |
| JP | 2011-504645 A | | 2/2011 | |
| KR | 10-2006-0106463 A | | 10/2006 | |
| KR | 10-0731415 B1 | | 6/2007 | |
| KR | 10-0875608 B1 | | 12/2008 | |
| KR | 10-2012-0060699 A | | 6/2012 | |
| WO | WO 2015/024531 A1 | | 2/2015 | |
| WO | WO 2015015841 | * | 2/2015 | H01M 2/26 |

OTHER PUBLICATIONS

Thesaurus.com Weld entry {https://www.thesaurus.com/browse/weld} printed Aug. 3, 2018.*
KIPO Notice of Allowance dated Feb. 21, 2017, for corresponding Korean Patent Application No. 10-2015-0049232 (5 pages).
KIPO Office Action dated Aug. 18, 2016, for corresponding Korean Patent Application No. 10-2015-0049232 (6 pages).
EPO Extended Search Report dated Jun. 13, 2016, for corresponding European Patent Application No. 16164049.5 (6 pages).
EPO Office Action dated May 26, 2017, for corresponding European Patent Application No. 16164049.5 (5 pages).
EPO Office Action dated Oct. 20, 2017, for corresponding European Patent Application No. 16164049.5 (4 pages).
Chinese Office Action, with English translation, dated Dec. 18, 2019, for corresponding Chinese Patent Application No. 201610208353.X (19 pages).
Japanese Patent Office action for corresponding Japanese Patent Application No. 2015-211130, dated Aug. 5, 2019, 5 pages.
Chinese Office Action dated Aug. 7, 2020, for corresponding Chinese Patent Application No. 201610208353.X (8 pages).

* cited by examiner

RECHARGEABLE BATTERY

CROSS-REFERENCE TO RELATED APPLICATION

This application claims priority to and the benefit of Korean Patent Application No. 10-2015-0049232, filed in the Korean Intellectual Property Office on Apr. 7, 2015, the entire contents of which are incorporated herein by reference.

BACKGROUND

1. Field

Embodiments of the present invention relate to a rechargeable battery.

2. Description of the Related Art

A rechargeable battery differs from a primary battery in that it is designed to be repeatedly charged and discharged (e.g., recharged), while the latter is not designed to be recharged. A low-capacity rechargeable battery is used in small portable electronic devices, such as mobile phones, notebook computers, and camcorders, while a high-capacity rechargeable battery is widely used as a power source for driving a motor of a hybrid vehicle.

For example, a rechargeable battery generally includes a housing in which an electrode assembly is accommodated and a cap assembly for closing and sealing the housing. A positive electrode terminal and a negative terminal may be formed over the cap assembly. When assembling such a rechargeable battery, an uncoated region at one side of the electrode assembly may be coupled to a current collecting member which is coupled to the cap assembly. That is, the rechargeable battery may be manufactured by assembling various parts.

To enhance price competitiveness of such a rechargeable battery, the number of assembled parts should be reduced to simplify a manufacturing process.

The above information disclosed in this Background section is only for enhancement of understanding of the background of the invention and it may contain information that does not form prior art.

SUMMARY

An exemplary embodiment of the present invention provides a rechargeable battery designed to be manufactured by a simplified manufacturing process.

A rechargeable battery according to an exemplary embodiment of the present invention includes: an electrode assembly including a first electrode and a second electrode; a housing having an open side, the housing accommodating the electrode assembly; a cap assembly including a cap plate for closing and sealing the open side of the housing; a first current collecting member under the cap assembly and connected to the first electrode; a second current collecting member under the cap assembly and connected to the second electrode; and an insulating case joined with the cap assembly, arranged between the cap plate and the electrode assembly, and having grooves at portions thereof respectively corresponding to the first and second current collecting members.

The cap plate may include at least one coupling groove at a bottom surface of the cap plate, and the insulating case may include at least one coupling protrusion configured to be inserted into the coupling groove.

An inner diameter of the coupling groove may increase along its depth.

An end portion of the coupling protrusion may be fitted into the coupling groove after it is melted.

The insulating case may include two coupling protrusions, and the two coupling protrusions may be at opposite ends of the top surface of the insulating case.

The insulating case may include a plurality of coupling protrusions.

The grooves may be located to face opposite surfaces of the first current collecting member and opposite surfaces of the second current collecting member, respectively.

The insulating case may have a closed curved line shape and may extend along edges of the bottom surface of the cap assembly.

The rechargeable battery according to an exemplary embodiment of the present invention includes an insulating case. During a process of manufacturing a rechargeable battery in which the insulating case and the cap assembly are separated from each other, a process of inserting the insulating case should be performed after the electrode assembly is accommodated inside the housing.

However, during a process of manufacturing a rechargeable battery according to an exemplary embodiment of the present invention having a structure as described above, because the insulating case and the cap assembly are integrally formed, a separate process involving the insulating case may be omitted.

Accordingly, because the process of manufacturing a rechargeable battery according to an exemplary embodiment of the present invention can be simplified compared with a process of manufacturing a rechargeable battery in which the insulating case and the cap assembly are separated from each other, manufacturing time can be reduced, thereby improving productivity.

DETAILED DESCRIPTION

Figure 1:
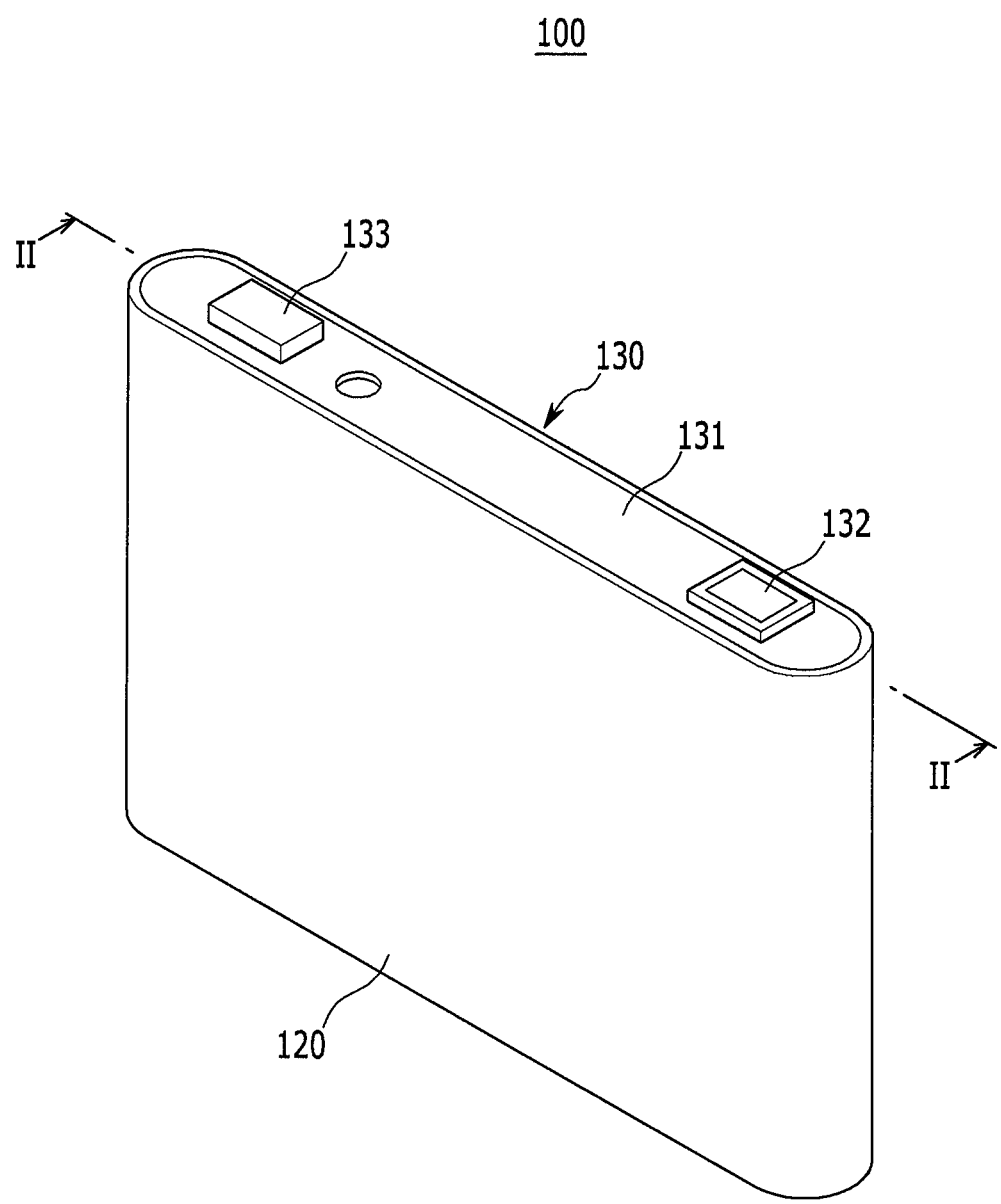
FIG. 1 is a perspective view of a rechargeable battery according to an exemplary embodiment of the present invention.

Aspects of the present invention will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Further, in describing exemplary embodiments of the present invention, for components having the same configuration, like reference numerals are used and may be described only in a representative embodiment and, in other exemplary embodiments, only configurations that are different from the representative embodiment may be described.

It will be understood that when an element or layer is referred to as being "on", "connected to", or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The terminology used herein is for the purpose of describing particular example embodiments only and is not intended to be limiting of example embodiments. As used herein, the singular forms "a" and "an" are intended to include the plural forms as well, unless the context clearly indicates otherwise. Furthermore, spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

Figure 2:
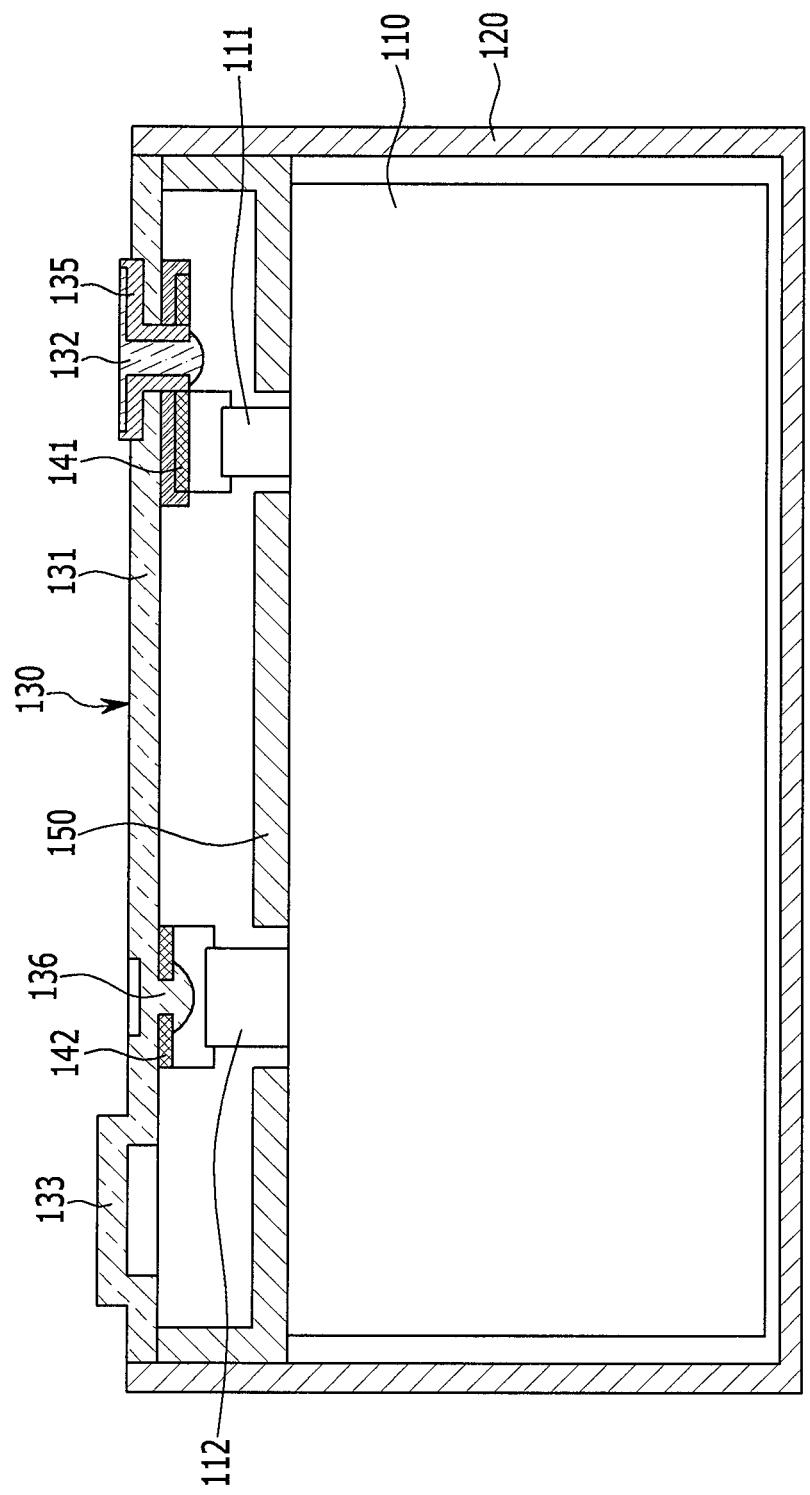
FIG. 2 is a cross-sectional view of the rechargeable battery according to the exemplary embodiment of the present invention illustrated in FIG. 1 taken along the line II-II of FIG. 1.
Figure 3:
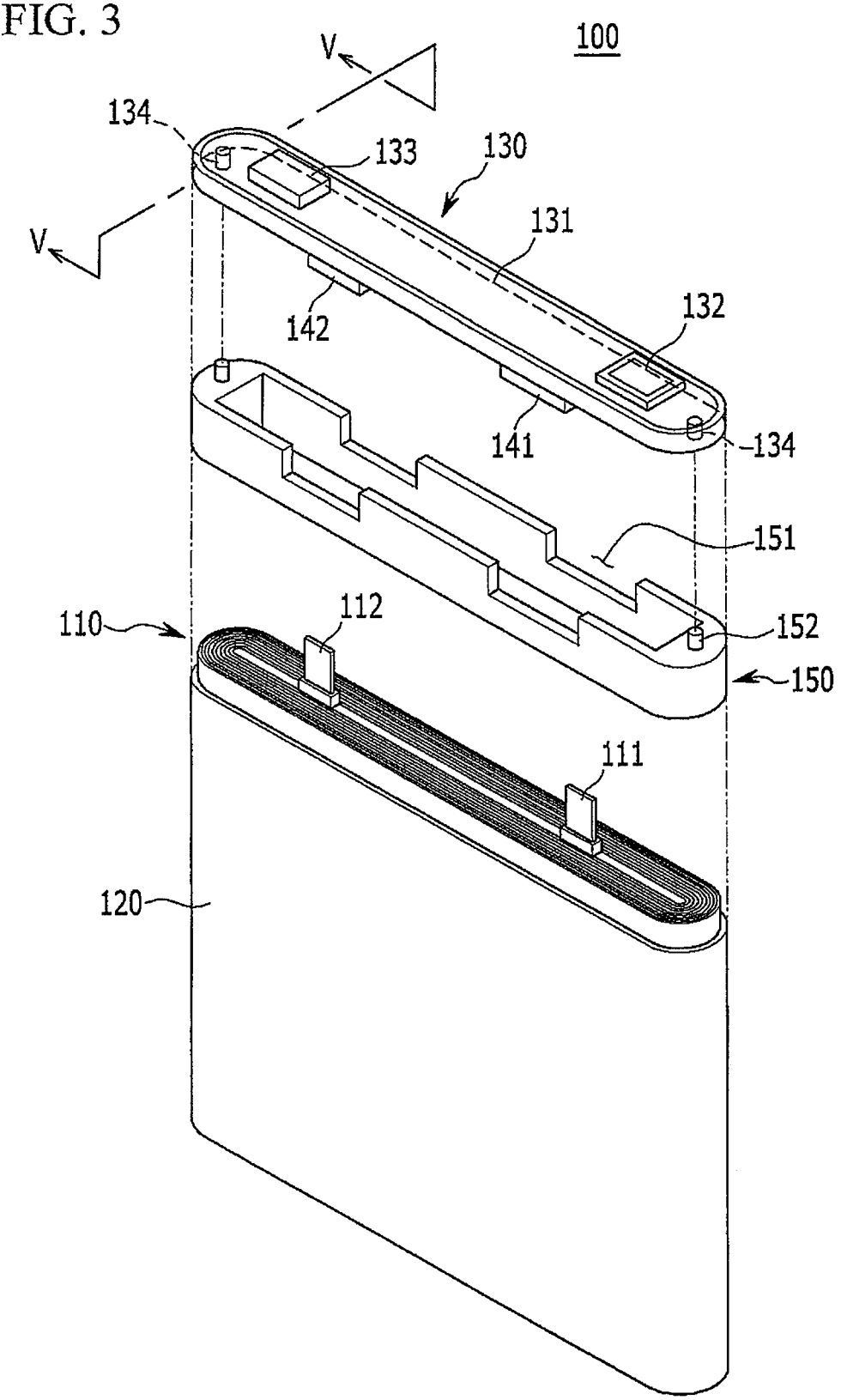
FIG. 3 is an exploded perspective view of the rechargeable battery according to the exemplary embodiment of the present invention illustrated in FIG. 1.

FIG. 1 is a perspective view of a rechargeable battery according to an exemplary embodiment of the present invention, FIG. 2 is a cross-sectional view of the rechargeable battery according to the exemplary embodiment of the present invention illustrated in FIG. 1 taken along the line II-II of FIG. 1, and FIG. 3 is an exploded perspective view of the rechargeable battery according to the exemplary embodiment of the present invention illustrated in FIG. 1.

Referring to FIGS. 1 to 3, the rechargeable battery 100 according to an exemplary embodiment of the present invention includes an electrode assembly 110, a housing 120, a cap assembly 130, a first current collecting member 141, a second current collecting member 142, and an insulating case 150.

The rechargeable battery 100 according to the current exemplary embodiment will be exemplarily described as having a prismatic shape and as being a lithium ion rechargeable battery. However, the present invention is not limited thereto, and aspects of the present invention may be applicable to various types of batteries, such as a lithium polymer battery, a cylindrical battery, etc.

The electrode assembly 110 may include a first electrode 111 and a second electrode 112. The first electrode 111 may be a positive electrode, while the second electrode 112 may be a negative electrode. However, the first electrode 111 is not limited to being the positive electrode and the second electrode 112 is not limited to being the negative electrode, and they can be changed according to a design.

One side of the housing 120 may be opened. The housing 120 accommodates the electrode assembly 110. For this purpose, the housing 120 may have a shape which is similar to a shape of the electrode assembly 110 and which is slightly larger than the electrode assembly 110. An opening is formed at a top surface of the housing 120. The housing 120 may be, for example, made of a metal, such as aluminum, stainless steel, etc.

The cap assembly 130 closes and seals the opening of the housing 120. For this purpose, the cap assembly 130 includes a cap plate 131. The cap plate 131 closes and seals the opening of the housing 120. For this purpose, the cap plate 131 may have, for example, a plate shape that is extended in a direction and may have the same or substantially the same shape as the opening of the housing 120.

A first terminal 132 and a second terminal 133 may be formed above the cap assembly 130.

For example, the first terminal 132 and the second terminal 133 may be positioned to protrude above the cap plate 131. The first terminal 132 is disposed near one end of the cap plate 131, while the second terminal 133 is disposed near the other (e.g., the opposite) end of the cap plate 131. The first terminal 132 and the second terminal 133 may be charged such that they have different polarities.

In one embodiment, the first terminal 132 may be disposed to penetrate the cap plate 131. For example, an upper end of the first terminal 132 may be exposed outside of the cap plate 131, and a lower end of the first terminal 132 may be disposed below the cap plate 131.

In addition, a sealing member 135 may be interposed between the first terminal 132 and the cap plate 131 to seal therebetween. The sealing member 135 may be a gasket, for example.

The first current collecting member 141 may be disposed below the cap assembly 130 to be connected to the first electrode 111. The first current collecting member 141 may be combined to a lower end of the first terminal 132. As such, because the first current collecting member 141 is connected to the first terminal 132, the first current collecting member 141 may electrically couple the first electrode 111 and the first terminal 132 to each other. Accordingly, when the first electrode 111 is a negative electrode, the first terminal 132 may be charged by the negative electrode.

The second current collecting member 142 is disposed below the cap assembly 130 and is connected to the second electrode 112. The second current collecting member 142 may be combined to a connecting protrusion 136 that is formed below the cap plate 131. For example, the second current collecting member 142 may be electrically coupled to the second electrode 112, but the present invention is not limited thereto.

Because the second current collecting member 142 is connected to the second terminal 133, the second current collecting member 142 may electrically couple the second electrode 112 and the second terminal 133 to each other. Accordingly, when the second electrode 112 is a positive electrode, the second terminal 133 may be charged by the positive electrode. In this embodiment, because the second terminal 133 is electrically coupled to the cap plate 131, the cap plate 131 may also be charged by the positive electrode.

One side of the insulating case 150 is joined with (e.g., integrally formed with) the cap assembly 130. For example, the insulating case 150 and the cap assembly 130 may be joined with each other prior to assembling the rechargeable battery 100. The insulating case 150 is provided between the cap plate 131 and the electrode assembly 110. For example, the insulating case 150 may be formed in a closed curved line shape extending along edges of the lower lateral surface of the cap assembly 130. For example, the insulating case 150 may be open at a bottom thereof.

A groove 151 (e.g., an opening or a through-hole) is formed in the insulating case 150. The groove 151 is formed in the insulating case 150 in accordance with (e.g., to correspond to) the first and second current collecting members 141 and 142. Furthermore, one or more openings may be formed at a bottom of the insulating case 150 corresponding to the first and second current collecting members 141 and 142.

Figure 4:
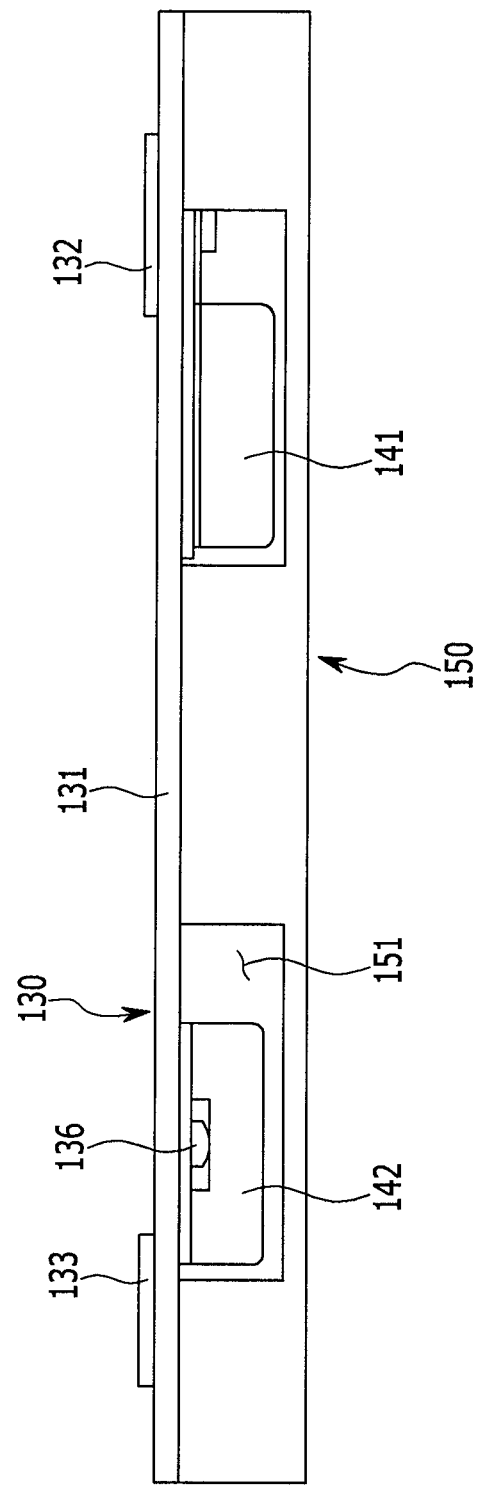
FIG. 4 is a side view showing only a cap assembly and an insulating case of the rechargeable battery according to the exemplary embodiment of the present invention illustrated in FIG. 1.

FIG. 4 is a side view showing only a cap assembly and an insulating case of the rechargeable battery according to the exemplary embodiment of the present invention illustrated in FIG. 1.

Referring to FIG. 4, a plurality of grooves 151 may be provided. In this embodiment, the plurality of grooves 151 may be formed in portions of the insulating case 150 that face opposite surfaces of the first current collecting member 141 and opposite surfaces of the second current collecting member 142.

For example, four grooves 151 may be provided and may be formed such that they face right and left surfaces of the first current collecting member 141 and right and left surfaces of the second current collecting member 142, respectively.

When a worker performs assembly work on the rechargeable battery 100 according to an exemplary embodiment of the present invention (refer to FIG. 3), the worker may insert a welding electrode or tool via the grooves 151 to easily weld the first current collecting member 141 with the first electrode 111 (refer to FIG. 3) and weld the second current collecting member 142 with the second electrode 112 (refer to FIG. 3).

Referring back to FIG. 3, the rechargeable battery 100 according to the exemplary embodiment of the present invention includes the insulating case 150. In a rechargeable battery in which an insulating case and a cap assembly are separated from each other, a process of inserting the insulating case should be performed after the electrode assembly is accommodated in the housing.

However, in the rechargeable battery 100 according to an exemplary embodiment of the present invention having the structure as described above, because the insulating case 150 and the cap assembly 130 are joined with each other (e.g., integrally formed), an additional process of installing the insulating case 150 may be omitted.

Accordingly, a process of manufacturing the rechargeable battery 100 according to an exemplary embodiment of the present invention can be simplified compared to a manufacturing process of a rechargeable battery having a structure in which the insulating case and the cap assembly are separate from each other (e.g., are not pre-assembled together) and manufacturing time can be reduced, thereby improving productivity.

The insulating case 150 described above may be made of a non-conductive material for insulation (e.g., to insulate the electrode assembly 110 from the cap plate 131). In one embodiment, the cap plate 131 is made of a conductive material so it can act as an electrode. For example, the cap plate 131 may be made of a conductive metal, and the insulating case 150 may be made of plastic.

As described above, because the insulating case 150 and the cap plate 131 are made of different materials, the insulating case 150 and the cap plate 131 may be separately manufactured and then joined to each other (e.g., combined together) when manufacturing the rechargeable battery 100 according to an exemplary embodiment of the present invention.

A structure for joining the cap plate 131 and the insulating case 150 together will now be described in more detail.

At least one coupling groove 134 may be formed at a bottom surface of the cap plate 131. In addition, a top surface of the insulating case 150 may include a coupling protrusion 152 to be inserted in the coupling groove 134. The coupling protrusion 152 may be forcedly fitted into the coupling groove 134 (e.g., the coupling protrusion 152 may be the same size as or slightly larger than the coupling groove 134).

Two coupling protrusions 152 may be provided, and the two coupling protrusions 152 may be respectively formed at opposite ends of the top surface of the insulating case 150. However, the number of coupling protrusions 152 is not limited to two, and more than two coupling protrusions 152 may be provided.

According to the structure as described above, the joining of the cap plate 131 and the insulating case 150 to each other may be performed relatively quickly.

Figure 5:
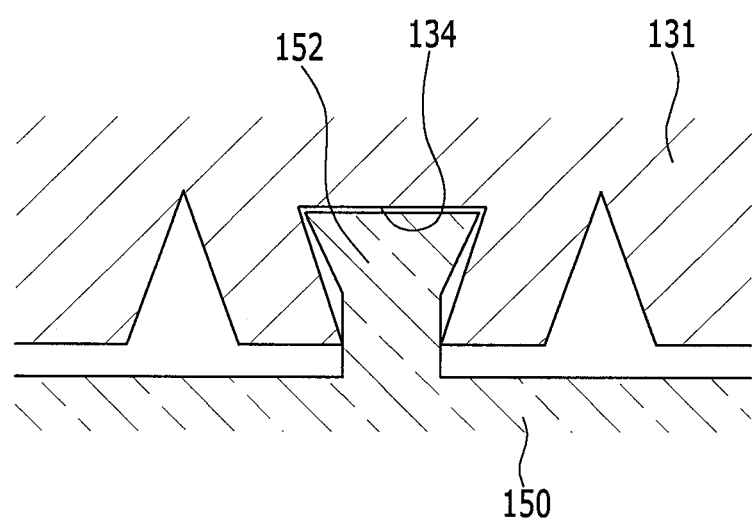
FIG. 5 is a cross-sectional view of the cap assembly joined with the insulating case in the rechargeable battery according to the exemplary embodiment of the present invention illustrated in FIG. 1 taken along the line V-V of FIG. 3.

FIG. 5 is a cross-sectional view of the cap assembly joined with the insulating case in the rechargeable battery according to the exemplary embodiment of the present invention illustrated in FIG. 1 taken along the line V-V of FIG. 3.

Referring to FIG. 5, an inner diameter of the coupling groove 134 formed in the cap plate 131 may increase along its depth (e.g., the coupling groove 134 may have a greater diameter near a bottom thereof than at an opening thereof). In this embodiment, for example, to combine the coupling protrusion 152 and the coupling groove 134, an end portion of the coupling protrusion 152 may be heated or melted and then fitted into the coupling groove 134.

In this embodiment, the coupling protrusion 152 is hardened after it is fitted into the coupling groove 134. Because the inner diameter of the coupling groove 134 increases along its depth, it has an inverted triangular cross-sectional shape. Accordingly, the hardened coupling protrusion 152 may not be easily separated from the coupling groove 134.

The structure as described above may further improve a coupling force between the cap plate 131 and the insulating case 150 compared to the structure where the cap plate 131 and the insulating case 150 are forcedly fitted into each other.

While the present invention has been described in connection with what is presently considered to be practical exemplary embodiments, the drawings and the detailed description of the present invention which are described above are merely illustrative, are presented for the purpose of describing aspects of the present invention, and should not be interpreted as limiting the scope of the present invention. Therefore, it will be understood by those skilled in the art that various modifications and other equivalent exemplary embodiments may be made from the present invention. Accordingly, an actual technical protection scope of the present invention is to be defined by the claims and their equivalents.

| Description of Some Reference Symbols | |
| --- | --- |
| 100: rechargeable battery | 110: electrode assembly |
| 111: first electrode | 112: second electrode |
| 120: housing | 130: cap assembly |
| 131: cap plate | 132: first terminal |
| 133: second terminal | 134: coupling groove |
| 135: sealing member | 136: connecting protrusion |
| 141: first current collecting member | 142: second current collecting member |
| 150: insulating case | 151: groove |
| 152: coupling protrusion | |

What is claimed is:

1. A rechargeable battery comprising:
an electrode assembly comprising a first electrode and a second electrode;
a housing having an open side, the housing accommodating the electrode assembly;
a cap assembly comprising a cap plate for closing and sealing the open side of the housing and a first terminal extending through the cap plate, the cap plate comprising a coupling groove at a bottom surface thereof, the coupling groove being offset from where the first terminal extends through the cap plate, an inner diameter of the coupling groove increasing along its depth from the bottom surface of the cap plate toward an opposite upper surface of the cap plate;
a first current collecting member under the cap assembly and connected to the first electrode and the first terminal;
a second current collecting member under the cap assembly and connected to the second electrode; and
an insulating case joined with the cap assembly, the insulating case comprising a coupling protrusion inserted into the coupling groove in the cap plate, the insulating case having a closed shape with opposite first edges and opposite second edges and an open portion between the first and second edges, the open portion exposing a portion of a top surface of the electrode assembly through the insulating case, the first and second current collecting members protruding into and being respectively connected to the first and second electrodes in the open portion,
wherein a top surface of the insulating case contacts the cap plate and a bottom surface thereof is above the top surface of the electrode assembly, and
wherein the insulating case has grooves at portions thereof respectively corresponding to the first and second current collecting members, the grooves being in the first edges, open to the top surface of the insulating case, and extending in a depth direction toward the bottom surface thereof.

2. The rechargeable battery of claim 1, wherein an end portion of the coupling protrusion is fitted into the coupling groove after it is melted.

3. The rechargeable battery of claim 1, wherein the insulating case comprises two coupling protrusions, and the two coupling protrusions are at opposite ends of the top surface of the insulating case.

4. The rechargeable battery of claim 1, wherein the insulating case comprises a plurality of coupling protrusions.

5. The rechargeable battery of claim 1, wherein the grooves are located to face opposite surfaces of the first current collecting member and opposite surfaces of the second current collecting member, respectively.

6. The rechargeable battery of claim 1, wherein the first and second edges together form.

7. A method of manufacturing a rechargeable battery, the rechargeable battery comprising an electrode assembly comprising a first electrode and a second electrode, a housing for accommodating the electrode assembly, a cap assembly comprising a cap plate, a first current collecting member, a second current collecting member, a first terminal, and a second terminal, and an insulating case, the method comprising:
joining the insulating case and the cap assembly to each other such that a coupling protrusion of the insulating case is inserted into a coupling groove in a bottom surface of the cap plate, the coupling groove being offset from where the first terminal extends through the cap plate, an inner diameter of the coupling groove increasing along its depth from the bottom surface of the cap plate toward an opposite upper surface of the cap plate;
inserting the electrode assembly into the housing;
welding the first and second electrodes of the electrode assembly to the first and second current collecting members, respectively, through grooves in the insulating case after the joining of the insulating case and the cap assembly, the grooves in the insulating case being open to a top surface thereof and extending in a depth direction toward a bottom surface thereof; and
placing the cap assembly with the insulating case joined thereto onto the housing to close and seal the housing.

8. The method of claim 7, wherein the joining the insulating case and the cap assembly to each other comprises:
melting the coupling protrusion on the insulation case;
inserting the melted coupling protrusion into the coupling groove in the cap plate of the cap assembly; and
hardening the melted coupling protrusion to join the insulating case and the cap assembly to each other.

9. The rechargeable battery of claim 1, wherein the insulating case has a height between the top surface and the bottom surface thereof, and
wherein the grooves in the insulating case have a depth in the depth direction parallel to the height of the insulating case that is less than the height of the insulating case.

* * * * *